United States Patent [19]
Mori et al.

[11] 4,421,955
[45] Dec. 20, 1983

[54] DISTRIBUTED SWITCHING SYSTEM

[75] Inventors: Hiromichi Mori, Kawasaki; Jun Matsumoto, Tama; Masanobu Fujioka, Tokyo, all of Japan

[73] Assignee: Kokusai Denshin Denwa Kabushiki Kaisha, Tokyo, Japan

[21] Appl. No.: 296,616

[22] Filed: Aug. 27, 1981

Related U.S. Application Data

[63] Continuation-in-part of Ser. No. 147,899, May 8, 1980, abandoned.

[30] Foreign Application Priority Data

Jul. 20, 1979 [JP] Japan .................................. 54-91637

[51] Int. Cl.³ .............................................. H04Q 3/42
[52] U.S. Cl. ............................ 179/18 EA; 179/18 ES
[58] Field of Search ..................... 179/18 ES, 18 EA; 370/67, 66, 68, 86, 88

[56] References Cited

U.S. PATENT DOCUMENTS

| 4,064,486 | 12/1977 | Faber ................................. 370/86 X |
| 4,071,701 | 1/1978 | Leijonhufvud et al. .............. 370/66 |
| 4,168,401 | 9/1979 | Molleron et al. ...................... 370/66 |
| 4,194,090 | 3/1980 | Yabe et al. ....................... 179/18 ES |
| 4,201,889 | 5/1980 | Lawrence et al. ......... 179/18 ES X |
| 4,210,782 | 7/1980 | Fujita ............................... 179/18 ES |
| 4,228,536 | 10/1980 | Gueldenpfennig et al. .......... 370/66 |

FOREIGN PATENT DOCUMENTS

| 53-129907 | 11/1978 | Japan ............................... 179/18 ES |
| 1441613 | 7/1976 | United Kingdom ........... 179/18 ES |
| 588657 | 1/1978 | U.S.S.R. .......................... 179/18 ES |

OTHER PUBLICATIONS

"Design Approaches and Performance Criteria for Integrated Voice/Data Switching", by Ross et al., *Proceedings of the IEEE*, vol. 65, No. 9, Sep. 1977, pp. 1283-1295.

"Interprocessor Communication in Systems with Distributed Control", by Jovic et al., *Proceedings of the IEEE*, vol. 65, No. 9, Sep. 1977, pp. 1323-1329.

*Primary Examiner*—Thomas W. Brown
*Attorney, Agent, or Firm*—Pollock, Vande Sande & Priddy

[57] ABSTRACT

A distributed switching system is disclosed which includes a plurality of simple-function switching units interconnected by speech path links, each unit having a speech-path switch, a plurality of processing units connected to speech-paths for use in signal and call processing, and an inter-unit bus for the connection between the switching units and the processing units, and functions as a single large switching system as a whole.

4 Claims, 21 Drawing Figures

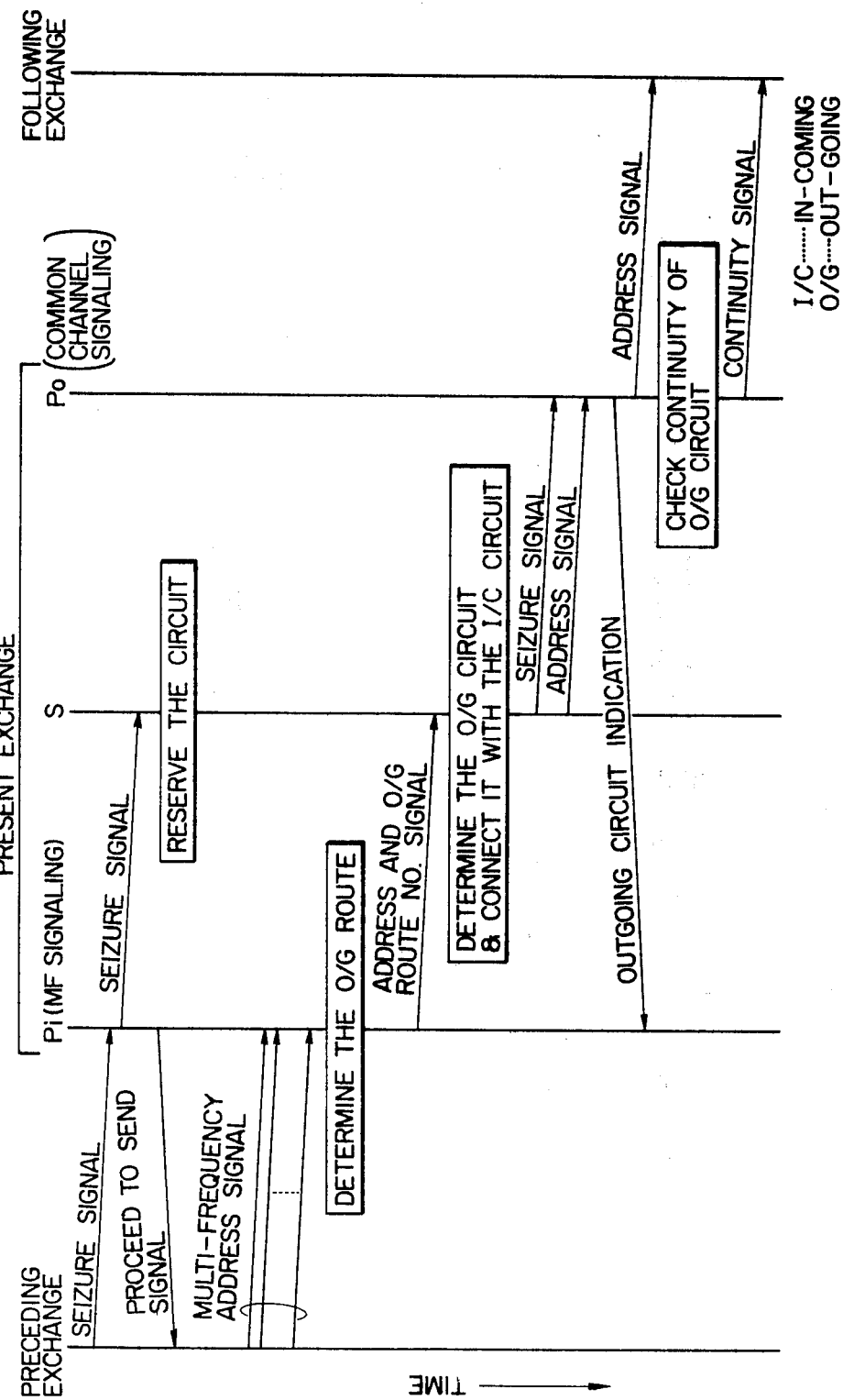

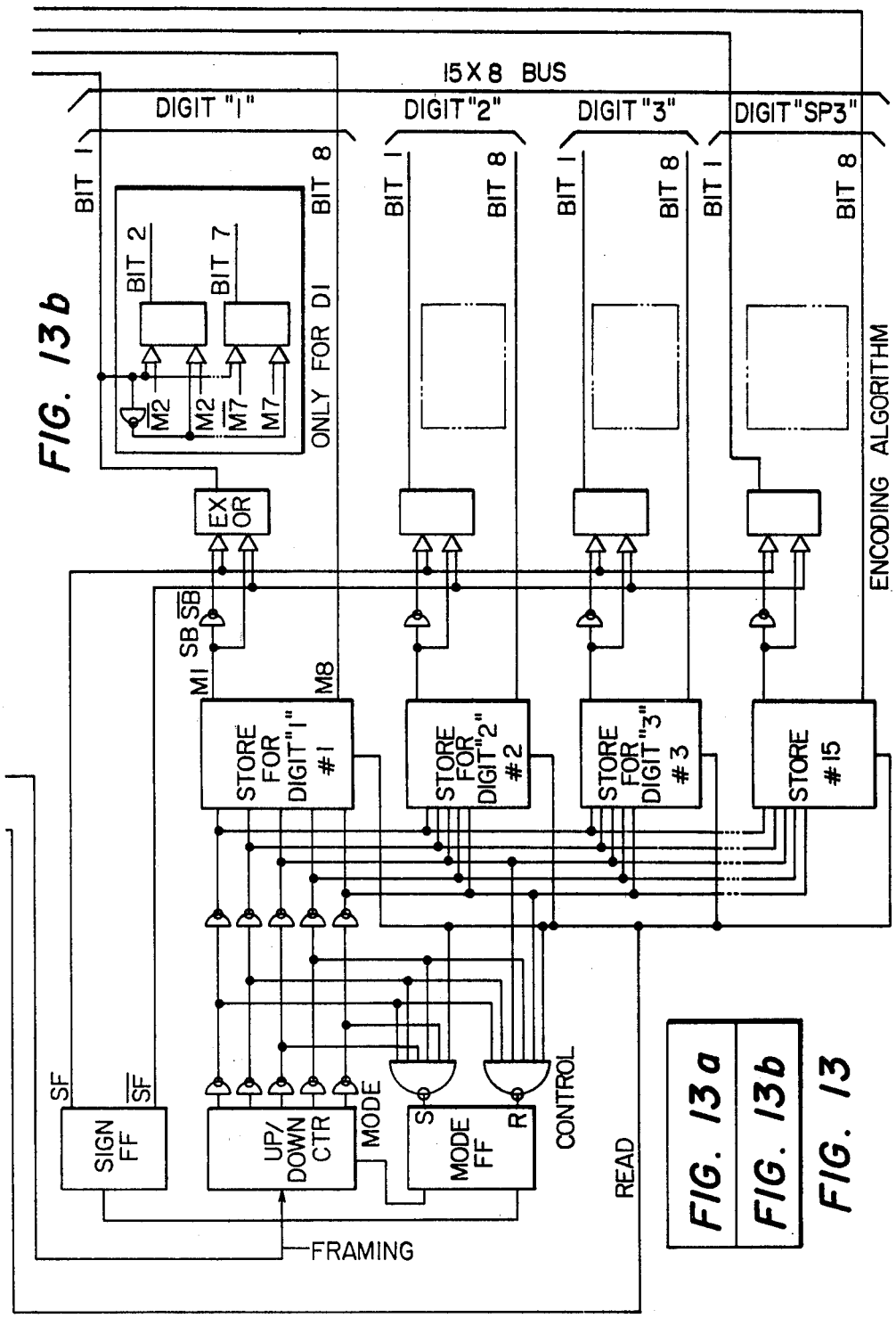

4,421,955

DISTRIBUTED SWITCHING SYSTEM

CROSS REFERENCE TO RELATED APPLICATION

This application is a continuation in part of U.S. application Ser. No. 147,899 filed May 8, 1980, now abandoned.

THE FIELD OF THE INVENTION

This invention relates to a distributed switching system which is a combination of small simple-function switching units and a plurality of processing units for signal and call processing, and functions as a large switching system as a whole.

DESCRIPTION OF THE PRIOR ART

As prior art, a completely common controlled switching system is known wherein signal processing, call processing, and speech-path switching are all controlled by a single processor, and the data common to the system are centralized.

Another switching system is also known wherein signal processing is independently carried out by each signal processor assigned to some number of speech-paths, while call processing and speech-path switching are controlled by a central processor.

SUMMARY OF THE INVENTION

It is an object of this invention to provide a large scale switching system consisting of small simple-function switching units having fairly high mutual independence.

It is another object of this invention to provide a distributed switching system in which signal processing, call processing and speech-path switching are distributively controlled by a set of small units, and the common data for the system are dispersed to each unit for the distributive control.

A feature of this invention is in the following configuration: i.e., a plurality of simple-function switching units interconnected by speech-path links, each unit having a speech-path switch, a plurality of processing units for call processing and signal processing on the speech-paths connected to them, said each switching unit and each processing unit interconnected by an inter-unit bus and a plurality of processing units, each unit independently dealing with the incoming processing or the outgoing processing of each call: i.e., signal and call processing of only the incoming side for the incoming call on each line which is connected to the unit, or signal and call processing of only the outgoing side for the outgoing call on each outgoing line which is connected to the unit.

DETAILED DESCRIPTION OF THE INVENTION

Figure 1:
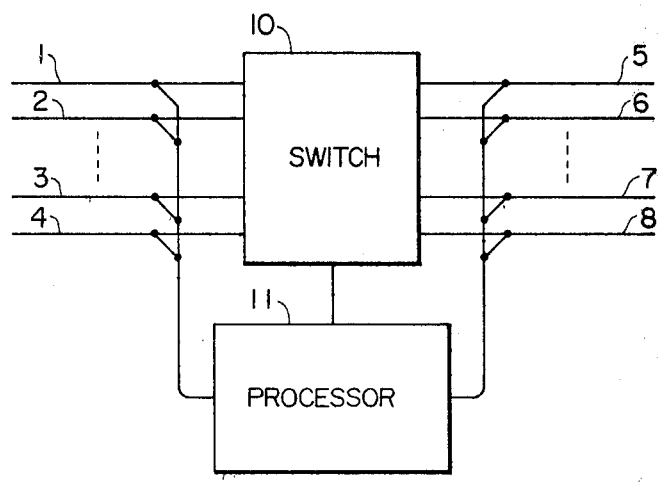
FIGS. 1 and 2 show prior art electronic switching systems.

FIG. 1 shows a known electronic switching system. In this system, a single processor 11 carries out the call processing and the signal processing for the calls over speech-paths 1, 2, . . . 8, and controls the operation of the speech-path switch 10. This processor 11 also manages the common data of the system. Thus, the above mentioned electronic switching system shown in FIG. 1 is a completely common control type.

Figure 2:
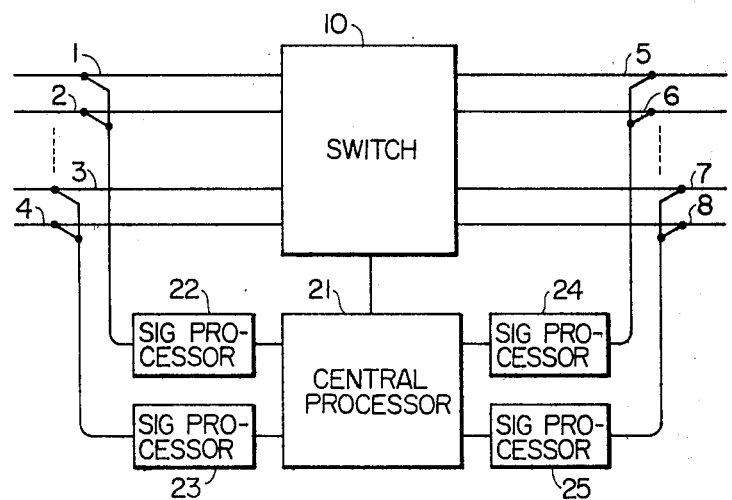

FIG. 2 shows the configuration of another known switching system. In the system of this figure, each signal processor 22, 23, 24 or 25 is assigned to a certain number of speech-paths and executes the processing of the signals sent over the corresponding speech-paths 1, 2, . . . 8. Both the call processing and the operation of the speech-path switch 10 are controlled by the central processor 21. The present prior art system is a combination of function-division and central control.

The systems in which a fairly large part of control is centralized as shown in FIGS. 1 and 2 have the disadvantage that a system, whose capacity is large enough to meet the maximum processing demand, must be installed even at the beginning of the installation when the amount of traffic to be processed is rather small.

In addition, the function executed by the central processor will be very complicated, and modification and expansion of the function will be less versatile. The stability of the central processor directly affects the stability of the entire system, and hence a slight trouble of the processor will stop the operation of the entire system, bringing all the speech-paths connected to the system out of service.

Another prior art switching system utilizing function division and load sharing is shown in U.S. Pat. No. 4,194,090. That switching system includes signal processor units for signal processing, switch processor units for switch control, call processor units for call processing, and the system bus for data transmission among those units. The signal processors of this switching system deal with only the signal processing, and the switch processors deal with only the switch control, that is, those signal processors and switch processors act as front-end processors working under the control of call processors. In addition, call processing which is the most complicated of all the processings is centralized to call processors with the common data necessary for call processing. Although the processing in the call processors of said switching system may be less complicated than that in the central processing unit of the common control type telephone switching system shown in FIG. 1, it is still fairly complicated because of the above configuration, and it is less versatile and less reliable.

Figure 3:
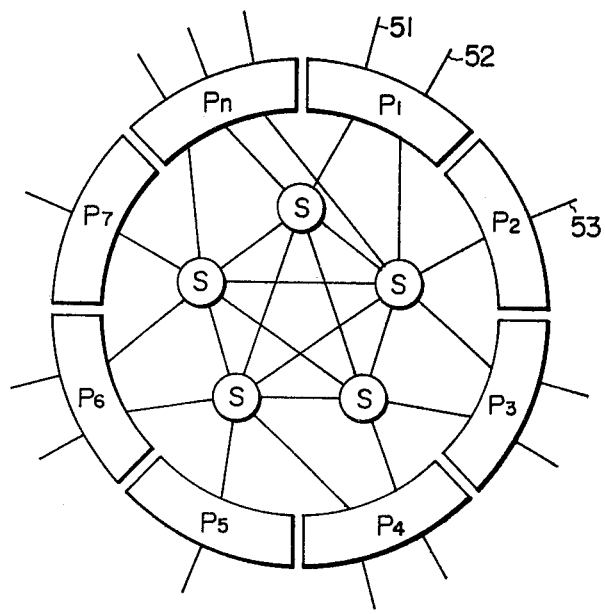
FIG. 3 is a drawing illustrating a configuration of the distributed switching system of this invention.

Detailed explanation of an embodiment of the present invention will be made below. FIG. 3 shows a configuration of the distributed switching system of this invention.

Figure 9:
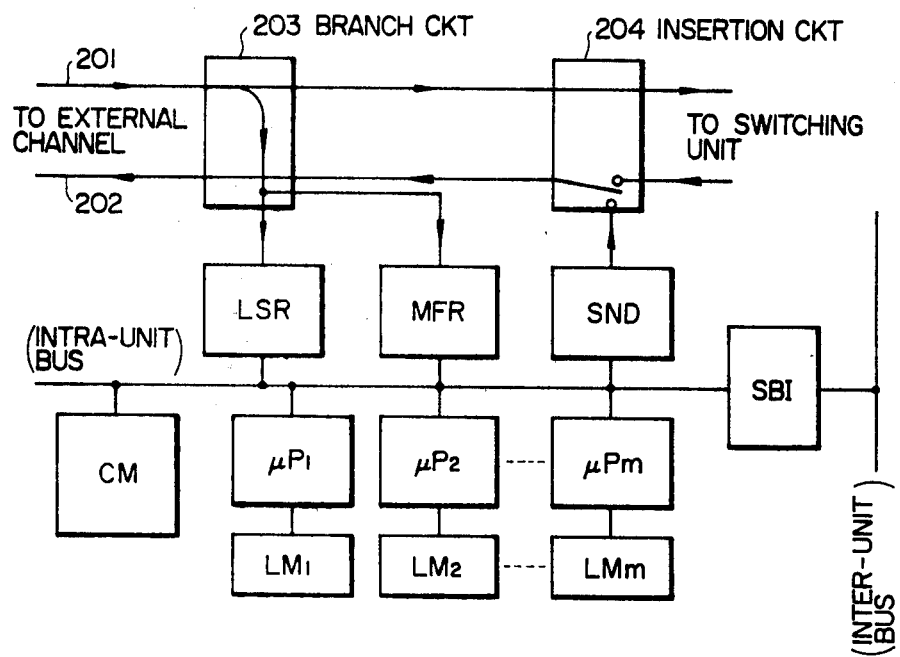
FIG. 9 and FIG. 14 show a detailed configuration of the processing unit P.
Figure 14:
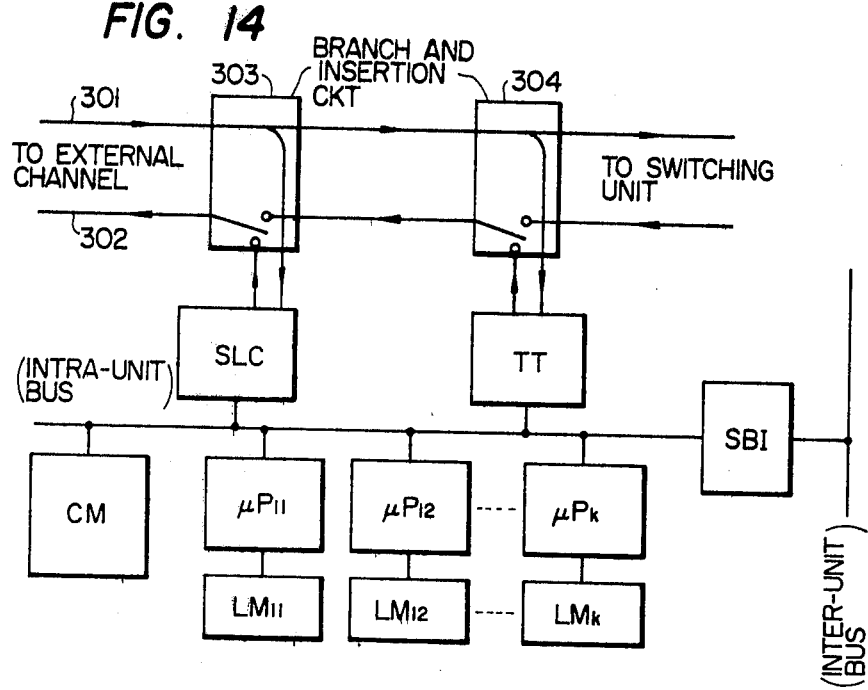
Figure 18:
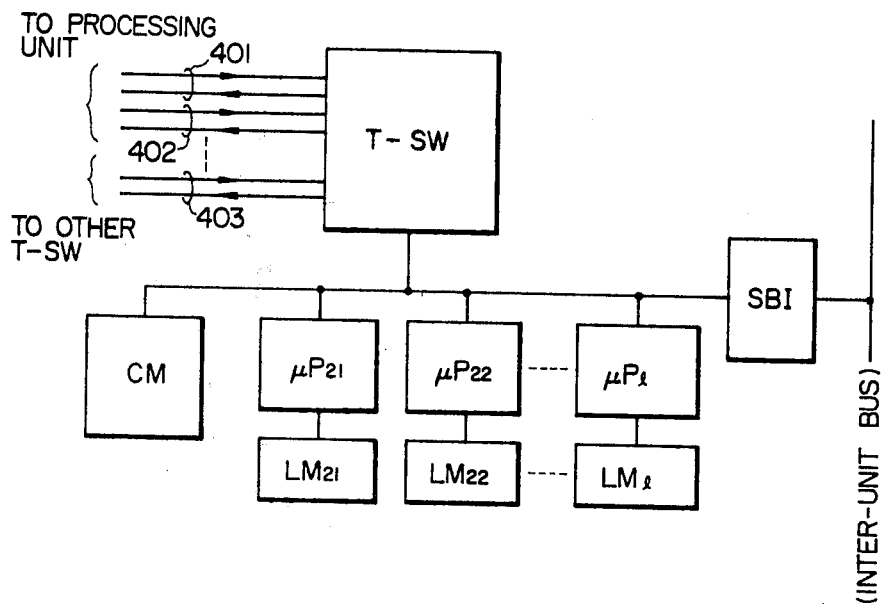
FIG. 18 shows an embodiment of switching unit S.

In the figure, reference symbols P1, P2, ... Pn denote the processing units for signal processing and call processing, S denotes a switching unit laying a speech-path switch and the control processor, and 51, 52, 53, etc. denote external speech-paths. Between the switching units S, a mesh of speech-path links is provided, to enable alternative routing from one unit to another, if necessary. Each of the processing units P1, P2, ... Pn and switching units S is provided with its own memory as shown in FIGS. 9, 14 and 18, and those memories store the allotted common data of the system.

Figure 4:
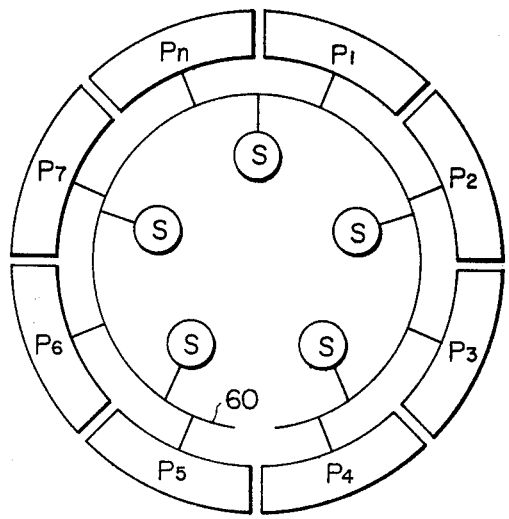
FIG. 4 shows an inter-unit bus interconnecting the units.

The processing units P and the switching units S are connected by an inter-unit bus, which transmits the control information between the units. The inter-unit bus and connections of the units by it are shown in FIG. 4. In the figure, the inter-unit bus is indicated by reference number 60.

Figure 5:
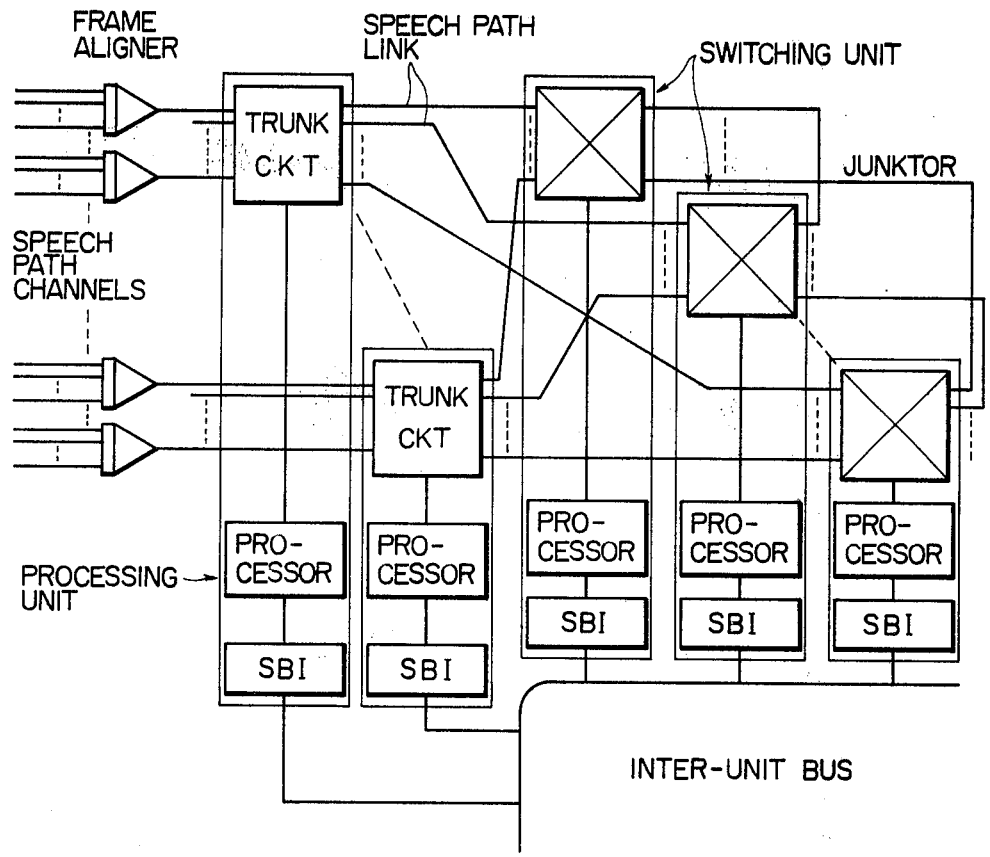
FIG. 5 shows an embodiment of the distributed switching system of this invention.

FIG. 5 shows an embodiment of the distributed switching system according to this invention implemented on the configuration principle mentioned above. In the figure, a frame aligner consisting of a synchronizer, multiplexer and demultiplexer, carries out the synchronization of the external speech-path channels, multiplexing and demultiplexing. A processing unit consists of a trunk circuit, processors and SBI (System Bus Interface). The trunk circuit is controlled by processors in the processing unit to do such tasks as signal branching/insertion, signal tone generation, and signal detection for signal processing. The multiplexed speech-path links are connected through the trunk circuits to the switches in the switching unit. Each switch is controlled by a processor/processors to connect or disconnect the lines. Between the switching units, junctors are provided for alternative routing between the units. If necessary, each call can take an alternative route through one of those junctors. The processor in the switching units and the processor in the processing units are connected via SBI to the inter-unit bus.

Figure 6:
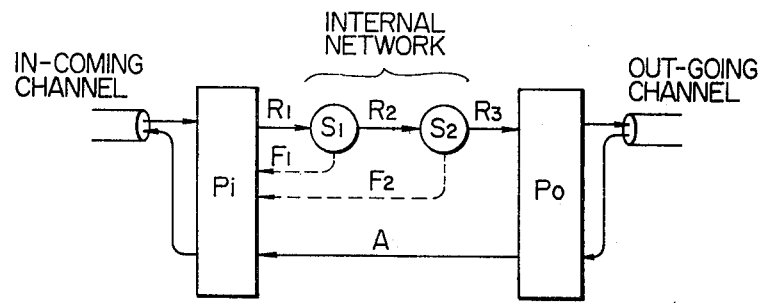
FIG. 6 is a drawing illustrating the principle of call connection in the switching system of this invention.

FIG. 6 shows a call connection scheme in the telephone switching system of the present invention. The switching system of this invention is used for circuit switching and each call enters the system at one channel and it is connected to another channel. The switching system includes a processing unit Pi for handling the incoming speech-path channel of a certain call, another processing unit Po for handling the outgoing speech-path channel, and switching units S1 and S2.

First, the processing unit Pi discriminates the control signal coming either through the incoming speech-path for such signaling systems as CCITT No. 5 and MFC, or through the signaling link in charge of control signal transmission for a common channel signaling system.

The unit Pi informs through the inter-unit bus the switching unit S1 to which the incoming channel is connected of the determined output route and in succession gives the unit S1 a request R1 to connect the incoming channel and one of the outgoing channels of the desired route. In response to the request R1, the switching unit S1 selects one of the idle channels of the outgoing route, accommodated in the unit, to connect the incoming and the outgoing channels.

In case the switching unit S1 has no idle channel of the desired output route, or if it has no channels of the outgoing route at all, the switching unit S1 sends a connection request R2 through an inter-unit bus to a different switching unit S2 which is expected to have some idle channels of the desired outgoing route. At the same time, the path between the units S1 and S2 for the alternating routing, or a junctor, is connected to the incoming channel. The switching unit S2, like the unit S1, tries to find an idle channel of the desired outgoing route. On finding an idle channel, the unit S2 connects the alternated incoming path from the unit S1 to the channel of the outgoing route. If neither the unit S1 nor the unit S2 can complete the call connection, and it is impossible to find an alternating path to the other units, the switching unit S1 or S2 informs the processing unit Pi of the situation through an inter-unit bus by sending a connection failure signal F1 or F2. The processing unit Pi, receiving the signal F1 or F2, decides whether the other outgoing route should be searched or the call connection should be given up. The connection method when another route is selected is the same as that described above.

After a call connection is set up between the incoming channel and the outgoing channel, the unit S1 or S2 gives a processing request R3, including the numbers of the incoming channel and the outgoing channel and the call processing request, to the processing unit Po for handling the outgoing channel. The processing unit Po sends out the control signal to the subsequent office, either through the outgoing line for No. 5 or MFC signaling system, or through the signaling link in charge of outgoing control signal transmission for a common channel signaling system on one hand, and an answer signal A through the inter-unit bus to the processing unit Pi on the other hand. Then the call connection comes to an end. Here, the control signal is not always necessary to be transmitted through incoming channels or outgoing channels, but in a common channel signaling system it is transmitted through the signaling channel. In that case, the processing units Pi and Po analyze and process the control signal in the similar manner to the one mentioned above. They also perform the routing control.

According to the principle of call connection described above, it is the processing unit P that determines the outgoing route, but instead of P the switching unit S is also available for the decision of the outgoing route. The latter, however, is undesirable because of the necessity to consider the particular attributes of each call. For example, if a telephone call has passed through a speech path including a channel via a satellite before coming into this switching system, the subsequent speech-path should not include the channel via a satellite. On the contrary, a data call may pass through the satellite repeatedly, but it must not be connected to a certain outgoing route. Moreover, there are various routing rules about which output route should be chosen by a certain call when all the channels to a certain outgoing route are busy.

Since such particular attributes of the call are found at the time when the call control signal is analyzed, it is better to decide the outgoing route at the processing unit P. The latter method will minimize the amount of information transferred between the processing units and the switching units, reducing the total amount of processing. The switching unit S will be free from a variety of signaling systems applied to its channels. Therefore, it may be considered a simple-function small-size switching system.

Figure 7B:
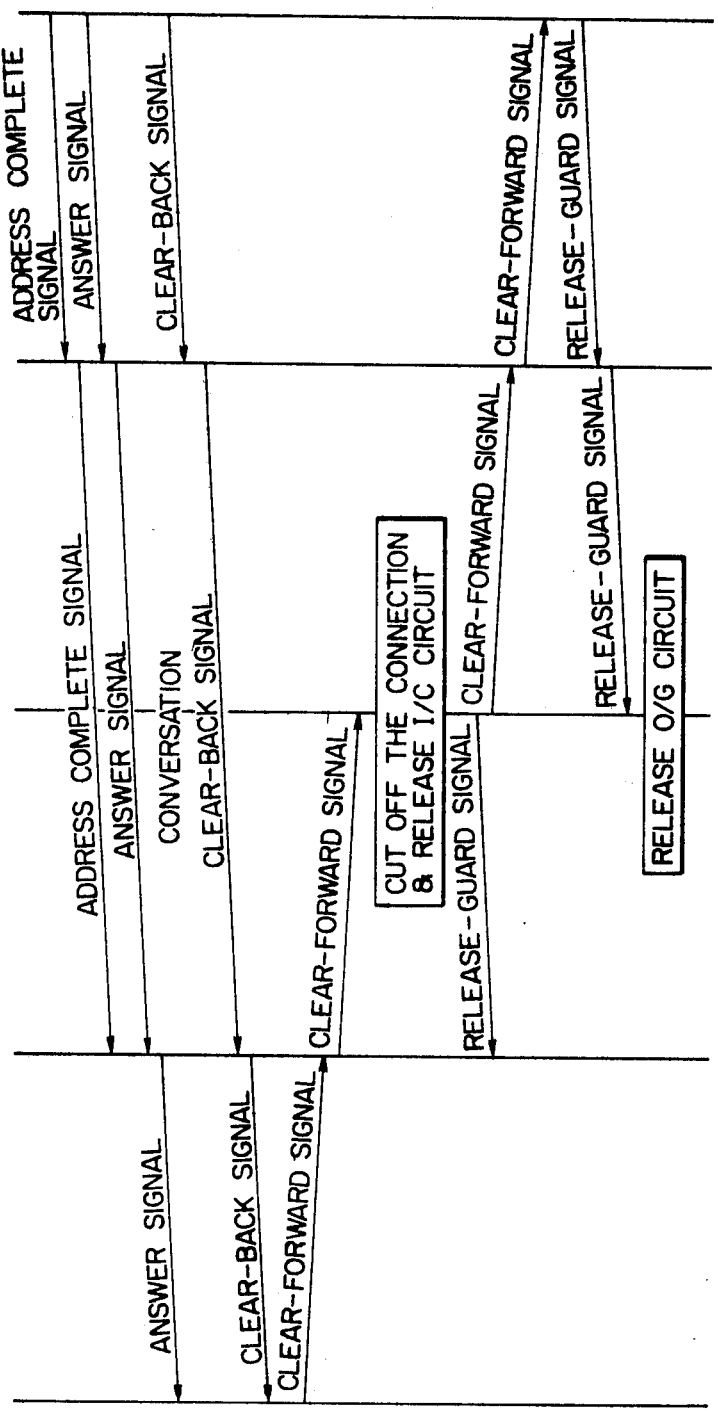
FIG. 7 (FIGS. 7a and 7b) shows a signal sequence between the switching system of this invention and another switching system, and a signal sequence between the units within the switching system of this invention.
Figure 7:
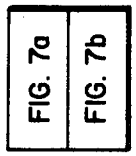

FIG. 7 shows details of a signal sequence between the switching system of this invention and other switching systems, and a signal sequence between units within the switching system of this invention, where the signals between units within the system are transmitted through an inter-unit bus.

In the example shown in the figure, an MF (Multi-Frequency) signaling system (e.g., CCITT No. 5 signaling system) is employed for the incoming channel and a common line signaling system (e.g., CCITT No. 7 signaling system) is employed for the outgoing channel. The signal sequence in this example is that of a successful call.

On receiving a seizure signal from an incoming channel, the processing unit Pi of the incoming side sends back a seizure acknowledgement signal to the incoming channel, and also sends a seizure signal through an inter-unit bus to the switching unit S to which the incoming channel is connected. After receiving the seizure signal, the unit S reserves the incoming channel so as not to use it as the outgoing channel for other calls.

The unit Pi, receiving from the incoming channel an MF address signal indicative of the called party number, determines the outgoing route of the call, and sends the outgoing route number and the address signal to said unit S, which selects one of the idle outgoing channels and connects it with the incoming channel. Then the unit S sends the seizure signal to the processing unit Po which deals with the signal and call processing of the outgoing channel, and further sends and address signal to Po. On receiving these signals, the unit Po informs the unit Pi of the outgoing channel number and sends the address signal to the following exchange. Moreover, the unit Po carries out the continuity check of the outgoing channel. If it obtains a good result, it sends the continuity check completion signal to the following exchange.

When the unit Po receives the address complete signal from the following exchange, the unit sends this signal to the unit Pi. The unit Po also sends a subsequently received answer signal to the unit Pi, which further transfers the signal to the preceding exchange. Thus, the speech path is established and the conversation (communication) between the subscribers begins.

After the end of the conversation, a clear-back signal is sent from the following exchange to the unit Po, which transfers the signal to the unit Pi. The unit Pi further transfers the signal to the preceding office. The unit Pi, receiving a clear-forward signal, transfers the signal to the unit S. The unit S disconnects the incoming channel from the outgoing channel, releases the incoming channel to its idle state, and sends a release-guard signal back to the unit Pi. The unit S also transfers a clear-forward signal to the unit Po. The unit Po transfers the received clear-forward signal to the following exchange. When the unit Po receives a release-guard signal from the following exchange, it sends the signal to the unit S. In response to the signal, the unit S releases the outgoing channel to its idle state. Thus, a call finishes.

The sequence mentioned above is that of a successful call. The signal sequences of abandoned calls or calls with called party busy are different from the above sequence. The principle of signal flows, however, is similar to that of the successful call, that is, signals for opening or closing the switches are transmitted through the switching unit S while the other signals are not passed through the unit S. Signals used within the switching system are independent of the signaling systems used for the external channels, and are unified.

As is obvious from the above explanation, in the distributed switching system of this invention, each unit works independently from other units and is controlled individually. Exchange of information between the units is executed with the unified internal signaling system which does not depend on the signaling systems used between the switching system of this invention and other switching systems. The switching unit, therefore, functions as if it were an independent single-function switching unit controlled by the internal signaling system, and under the control of internal signaling system it opens and closes the switches and finds idle channels. Therefore, the conventional switching systems are well available for the present switching units. It is only necessary to add an SBI (System Bus Interface).

Signal and call processing for the incoming channel and the outgoing channel are performed separately at the incoming processing unit and the outgoing processing unit, respectively. Common data are also distributed to the processing units; each processing unit has data necessary for signal and call processing of the channels connected to it. On the other hand, each switching unit has the information which is related to the channels connected to it. (e.g., the route given by a certain line).

Thus, according to the distributed switching system of this invention, the functions are completely distributed so that there is no hierarchy between the units. There is no centralized common data for the entire switching system, and hence each unit is independent.

If a processing unit P handles only the channels of a single signaling system, both the software and the hardware is simplified.

Figure 8:
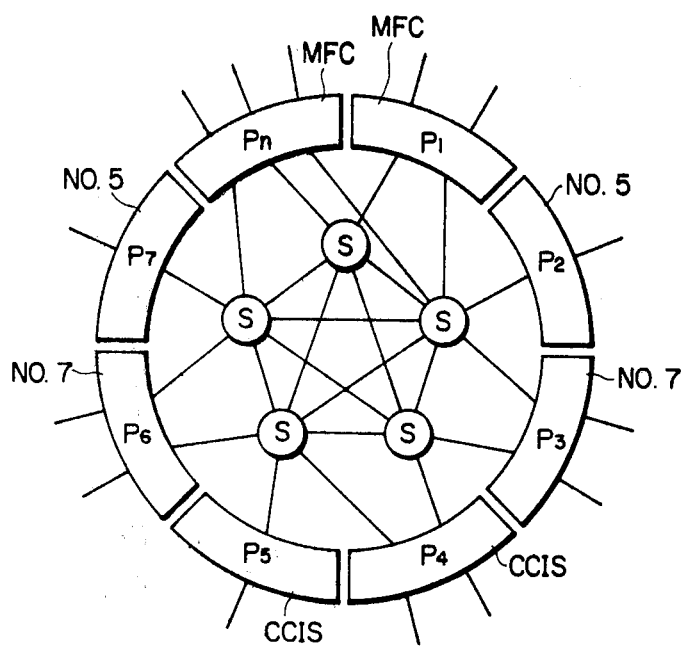
FIG. 8 shows another configuration of the switching system of this invention.

FIG. 8 shows another embodiment of this invention implemented from such viewpoint. In the figure, the processing units P1 and Pn handle only the MFC signaling system, the processing units P2 and P7 handle only the No. 5 signaling system, the processing units P3 and P6 handle only the No. 7 signaling system, and the processing units P4 and P5 handle only the CCIS (Common Channel Inter-office Signaling). In explanation of the figure, each processing unit takes charge of only one of said signaling systems, and the control of each signaling system is shared by two processing units.

If, in the processing unit P of this embodiment, signals of the external signaling system are converted into those of the unified internal signaling system to standardize the signaling system within the entire switching system as shown in FIG. 7, the processing within the switching system is unified, and the switching unit S is further simplified. Moreover, according to this embodiment, a mere addition of a new processing unit or the modification of an old unit makes it possible to add channels of a new signaling system or modify the existing signaling system without any influence upon the entire system, realizing a highly versatile system that can readily follow the alteration of external conditions.

As a switching system of this invention is composed of units highly independent of each other, they can be distributively arranged, thereby increasing reliability in case of a partial damage. Furthermore, the extreme dispersion of control in this invention makes it possible to utilize general-purpose micro-processors in place of conventional special-purpose processors for switching systems, making them economical. The speech-path switches of the switching unit S can be one stage memory switches. The memory switch can realize a time division switching of a plurality of multiplexed speech channels, reducing the number of parts and wirings necessry for the speech-path switching network. The memory switch also simplifies the control of the speech-path switches, therefore general-purpose micro-processors will be available for the control of the switching units S.

FIG. 9 shows a concrete example of the processing unit P. The processing unit of the figure is used for the channels of an MF signaling system, including a branching circuit 203 and an insertion circuit 204, where 201 and 202 denote the incoming and outgoing channels of the multiplex link. LSR is a line signal receiver and MFR a register signal receiver. SND is a signal sender. MP1, $\mu$P2 ... $\mu$Pn are micro-processors, LM1, LM2 ... LMn are local memories for individual $\mu$P, and CM is a common memory storing the common data for the operations of $\mu$Ps. All the $\mu$Ps are connected by the inter-unit bus to CM, LSSR, MFR and SND. SBI is a system bus interface connected to the inter-unit bus for information transfer between the units.

A line signal from the external channel 201 is received and analyzed at LSR. Such MF signals as digit signals are received and analyzed at MFR. The SND sends out line signals and MF signals over the external channel 202. The control of signal transmission and receiving is executed by one $\mu$P or shared by two or more $\mu$Ps. The call processing following the receipt of external signals, the call processing accompanied with the transmission of signals, and the processing associated with the information transfer to and from other units are shared and carried out by several $\mu$Ps. Data that the system has in common, such as call data and office data, are stored in the common memory CM, and the local memory LM stores nothing other than the data related to the program to be executed at each associated $\mu$P and those related only to each $\mu$P. The call management and charging are executed at the incoming side processing unit, and the related information is stored in the common memory CM. The information transfer to and from other units are carried out through the inter-unit bus via SBI.

Figure 10:
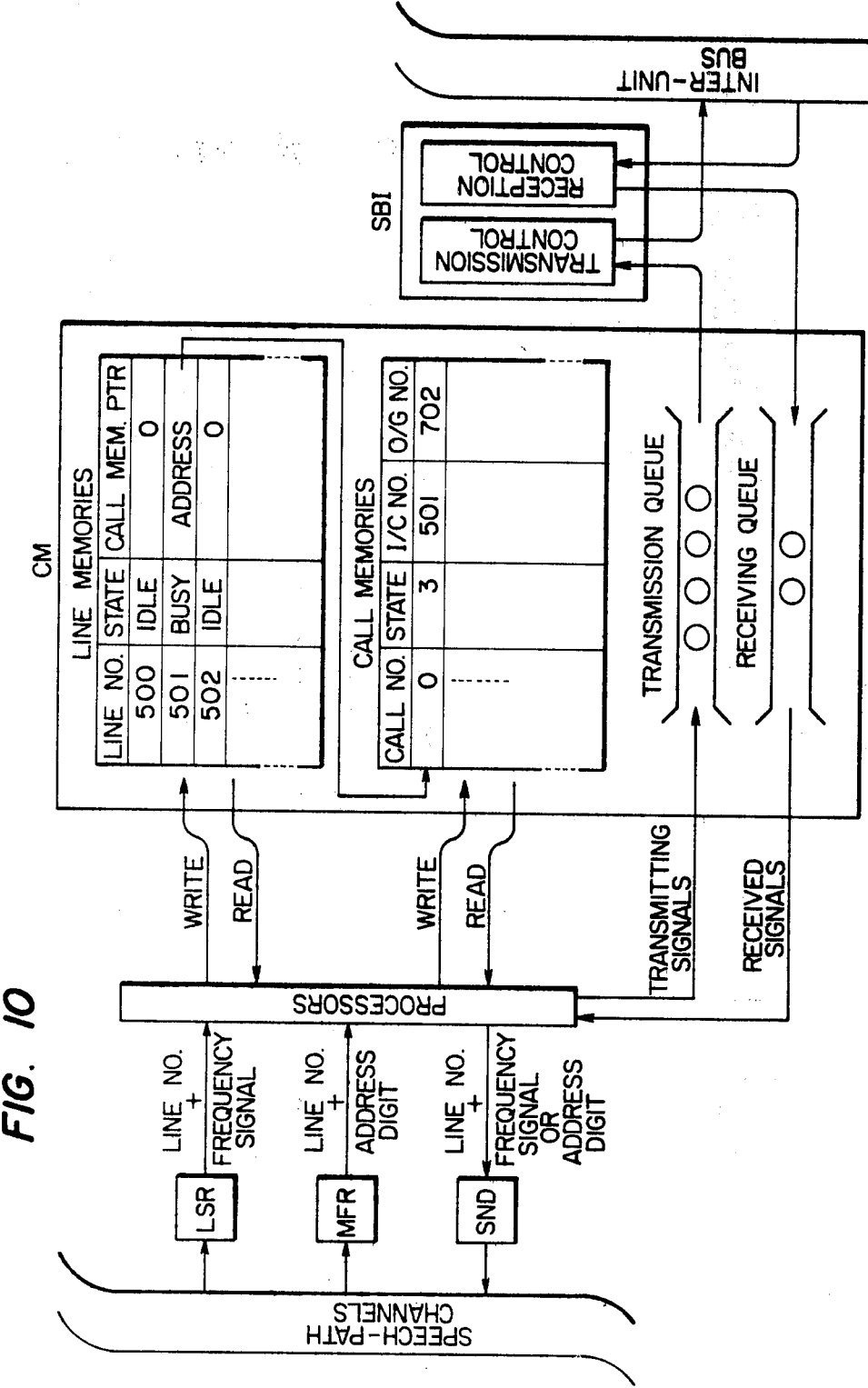
FIG. 10 shows a signal flow in the processing unit of FIG. 9 dealing with an MF (multi-frequency) signaling system.

FIG. 10 shows the flow of signals when the processing unit treats an MF signaling system (e.g., CCITT No. 5 signaling system). The LSR detects line signals coming over the speech-path and sends them as frequency signals (in No. 5 signaling system, a single signal of f1, a single signal of f2, or a composite signal of f1+f2, where f1=2,400 Hz, f2=2,600 Hz), together with the line numbers from which the signals have been received, to the processors. Similarly, MFR detects MF address signals and sends them as address digit signals, together with the line numbers, to the processors. The signals to be transmitted over the speech-paths are transmitted from the processors to SND as frequency signals or address digit signals, together with the line numbers to which the signals should be transmitted, and then they are transmitted from SND onto the speech-paths.

The signals to be transmitted over an inter-unit bus are produced at the processors in accordance with the internal unified signaling system. Those signals are transferred to the transmission queue in CM. Later, the SBI takes out those signals one by one from the queue and sends them over the inter-unit bus under the control of the transmission control section of SBI. The signals from the inter-unit bus are fed to the receiving queue of CM under the control of the reception control section of SBI and then they are sequentially read out by the processors.

CM includes line memories corresponding to the speech-paths connected to the unit, call memories for the calls handled in this unit as well as transmission and reception signal queues for the inter-unit bus. Line memory has an area memorizing busy/idle state of the corresponding speech-path, and an area memorizing the address of the call memory for the call using the speech-path. When the speech-path is busy, the address of the call memory is written there. Call memory memorizes the state number indicating the state or phase of each call and the incoming and outgoing speech-path numbers of the call. The reading and writing of line memories and call memories are performed by the processors when necessary.

With reference to FIG. 7 where the signal sequence of a successfully connected call is illustrated, a flow of processing and signaling in the processing unit of this invention will be explained. The unit here may be represented by Pi of FIG. 7. With a speech-path, line 501 for example, is selected as the outgoing path by the preceding exchange, a seizure signal is transmitted over the line. This signal is received as a frequency signal (e.g. f1 signal of No. 5 system) at LSR. The received signal is fed to the processors together with the line number 501. One of the processors detects it and checks the line memory area assigned to the speech-path. At this time, the speech-path is in idle state on its line memory. After changing the line memory into a busy state, the processor assigns one call memory for the call coming on the speech-path and sets the call state number into that indicating address digits waiting. At the same time, the processor writes the address of the call memory into the call memory pointer area of the line memory. Here in the figure, the call number is assumed to be 0 for convenience of explanation.

The processor makes a seizure signal fit for the internal unified signaling system and stores it in the transmission queue of CM so as to send it to the switching unit S to which the line 501 is connected. The seizure signal is then fed through an inter-unit bus to the switching units under the control of SBI. On the other hand, the processor instructs SND to send a proceed-to-send signal over the line 501 to the preceding exchange. In this case, the signal sent to the SND consists of the line number and the frequency signal (e.g. f2 of No. 5 signaling system) representing the proceed-to-send signal. Receiving the signal, SND sends a corresponding signal over the line 501.

Then, an MF (multi frequency) address signal comes through the line 501. This signal is detected by MFR and sequentially fed to the processor as digit signals. When the processor receives all the digits, it analyzes the digits to determine the outgoing route, and changes the call state on the call memory to the outgoing (O/G)

circuit indication waiting state. The processor also produces the signal consisting of the address digits and O/G route number to be transmitted to the switching unit S and stores it in the transmission queue.

The outgoing circuit indication signal sent from the processing unit Po at the outgoing side is stored in the receiving queue of CM under the control of the reception control section of SBI. This signal includes the incoming line number. Receiving this signal, the processor accesses the call memory of call number 0 referring to the incoming line number, changes the call state to the address complete signal waiting state. The address complete signal from Po, then changes the call state of the call number 0 to the answer waiting state.

Furthermore, in response to the answer signal from Po the processor changes the call state of the call number 0 to that in which communication is realized and instructs the SND to send an answer signal (e.g. f1 in No. 5 signaling system) onto the line 501. Receiving the clear back signal fed from Po, the processor changes the call state of the call number 0 to the clear forward waiting state, and instructs the SND to send out the clear-back signal (e.g. f2 in No. 5 signaling system) over the line 501.

The LSR receives the clear-forward signal (e.g. f1+f2 signal in No. 5 signaling system), and informs the processor. The processor, having received the signal, releases the call memory of the call number 0, and sends a clear-forward signal to the switching unit S. At the moment when it receives the release-guard signal from S, it changes the state of line memory of line 501 from the busy state to the idle state. All the process for the speech-path concerned is now completed.

Figure 11:
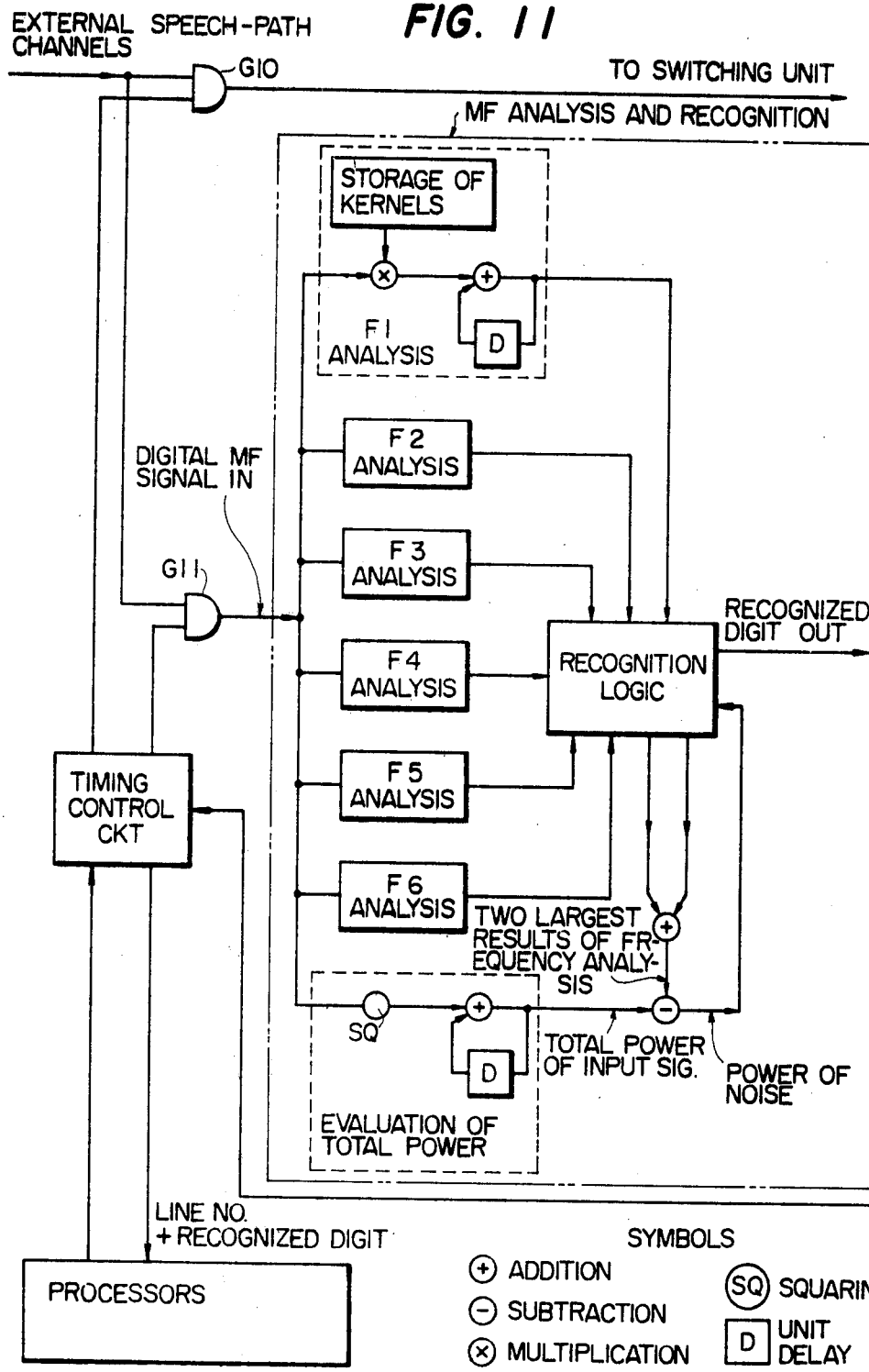
FIG. 11 shows an embodiment of a register signal receiver MFR illustrated in FIG. 9.

Next, referring to FIG. 11, the MFR of FIG. 9 will be explained in more detail. For the MF analysis and recognition logic, such circuits are available as described in IVAN KOVAL etal, "Digital MF Receiver Using Discrete Fourier Transform", IEEE Transactions on Communications, Vol. Com-21, No. 12, December 1973, FIG. 4. The MF signal to be received is supplied on a speech-path channel. This signal is directed to the MF analysis and recognition block through gate G11 and not to the switching unit because the gate G10 is closed due to the absence of signal from the timing control circuit. The block for analysis and recognition of MF signal gives a recognized digit to the timing control circuit, which sends the digit signal to the processor together with the speech-path number.

Figure 12:
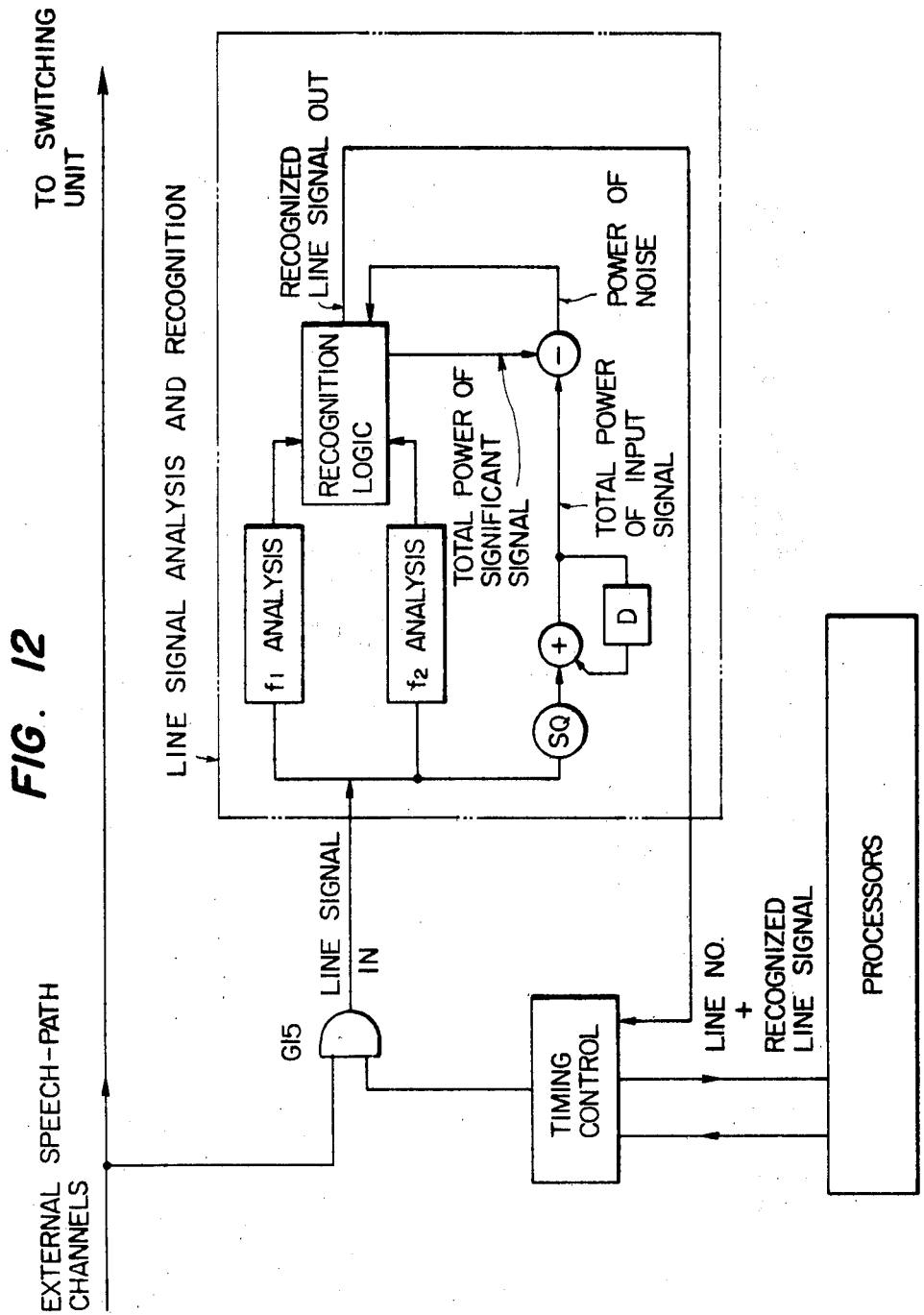
FIG. 12 shows an embodiment of a line signal receiver LSR illustrated in FIG. 9.

FIG. 12 illustrates the LSR of FIG. 9 in detail; the configuration of the line signal analysis and recognition block is the same as that of MFR except that the F1, F2, . . . F6 analysis and recognition blocks of FIG. 11 are replaced with analysis circuits for line signals f1 and f2. The line signal is fed through gate G15 to the line signal analysis and recognition block, which analyzes and recognizes the signals. If it detects a line signal, it informs the timing control of the signal it has detected. The timing control sends the line signal together with the speech-path number, to the processor.

Alternatively, the MFR and LSR may be of the kind disclosed in Fukinuki etal, "Structure of time division switching networks", ISS (International Switching Symposium), Kyoto, Japan, October, 1976, FIG. 7.

Figure 13A:
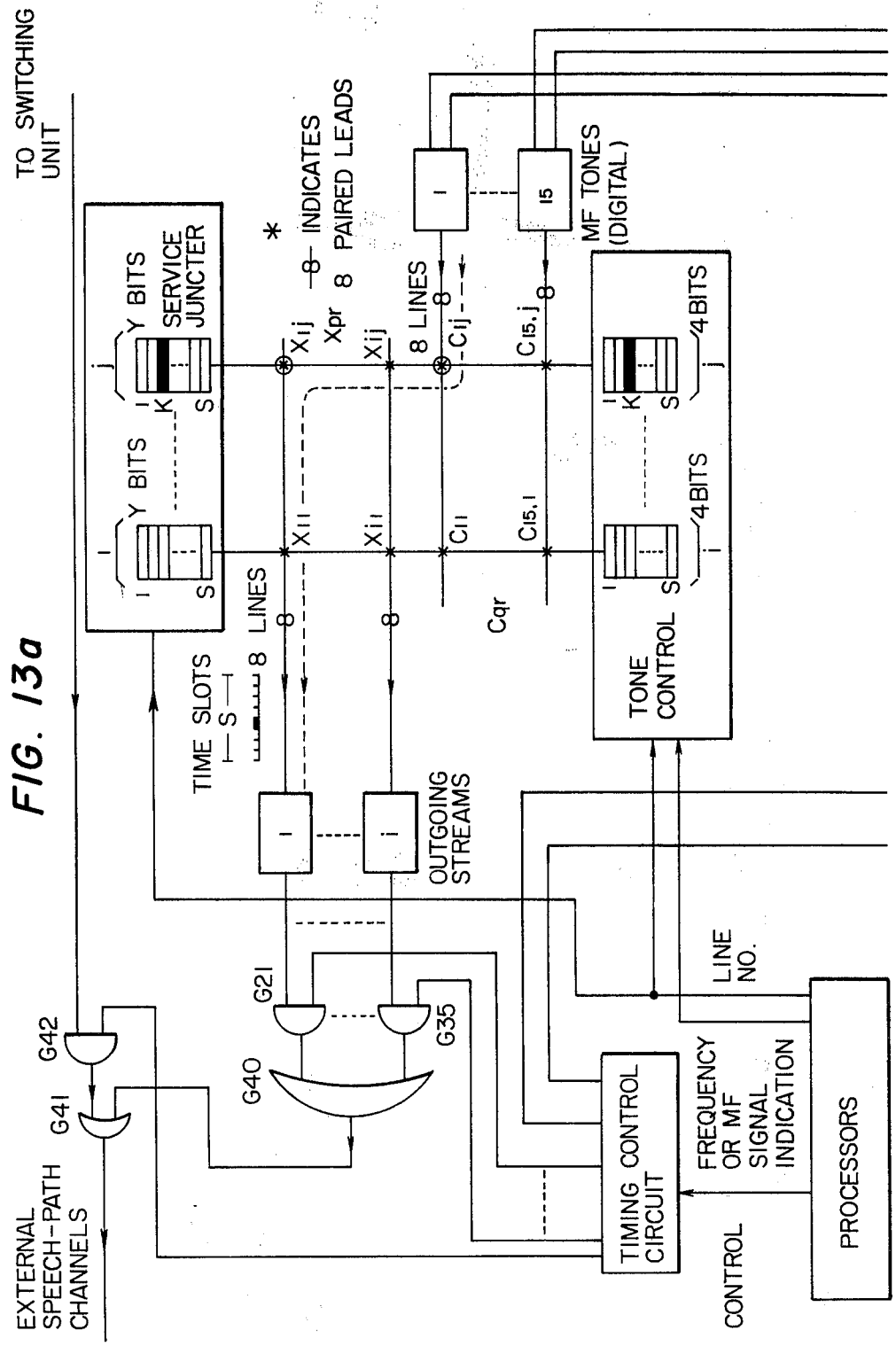
FIG. 13 (FIGS. 13a, 13b) shows an embodiment of a signal sender SND illustrated in FIG. 9.

FIG. 13 shows a detailed configuration of the SND of FIG. 9. This circuit is almost the same as that disclosed in SATYAN G. PITRODA "Multifrequency (MF) Tone-Generating System for a pulse-code-modulation (PCM) digital exchange", IEEE Transactions on Communication Technology, Vol. Com-19, No. 5, October 1971, FIGS. 3 and 4. However STOREs #13, #14, and #15, memorize the signal patterns of line signals f1, f2 and the combination of f1 and f2 respectively (e.g. f1=2400 Hz, f2=2600 Hz in CCITT No. 5 signaling system) because SND must send the line signals.

The processor gives both the tone controller and service junctor a line number indicative of the speech-path to which the signals are to be fed. The processor also gives the tone controller a frequency signal or an MF signal indication in order to inform SND of which signal it should send. The timing control circuit controls the gates G21–G35 so that the signals can be fed to the desired speech-path, and also controls the gate G42 to select either of the signals, that from the switching unit side or that from SND.

FIG. 14 shows another concrete example of the processing unit P. The figure shows the processing unit P for the speech-paths adopting a common channel signaling system. 301 and 302 are incoming and outgoing channels of the multiplexed link respectively, and the two blocks 303 and 304 are branch and insertion circuits. The multiplexed link includes speech-path channels and signaling channels. SLC is a signal link controller, which is so designed as to operate according to the procedure of transmission control specified in each signaling system. For instance, SLC for the No. 7 signaling system consists of a HDLC (High-Level Data Link Control) circuit and a circuit provided with link switching-over function. TT is a speech-path test trunk, which comprises, for example, a tone sender for sending out a tone over the speech-path and a tone receiver for receiving the tone sent over the speech-path if the continuity of the speech-path is good. The tone sender is the same in structure as said SND, and the tone receiver is structurally the same as said LSR. The other letter symbols indicate the same components as those of FIG. 9, i.e., microprocessors, the common memory and the system bus interface.

The signal link controller SLC controls the transfer of messages on the common channel signal link. The speech-path test trunk TT is for assuring the right connection of the speech-path by sending out and receiving a tone over the path or for short-circuiting the incoming side and outgoing side lines of the speech-path under test in response to the request from the exchange to which the other end of the speech-path is connected. The control of these equipments and the call processing are performed by one or more micro-processors. Other functions are the same as those of the processing unit of an MF signaling system shown in FIG. 9.

Figure 15:
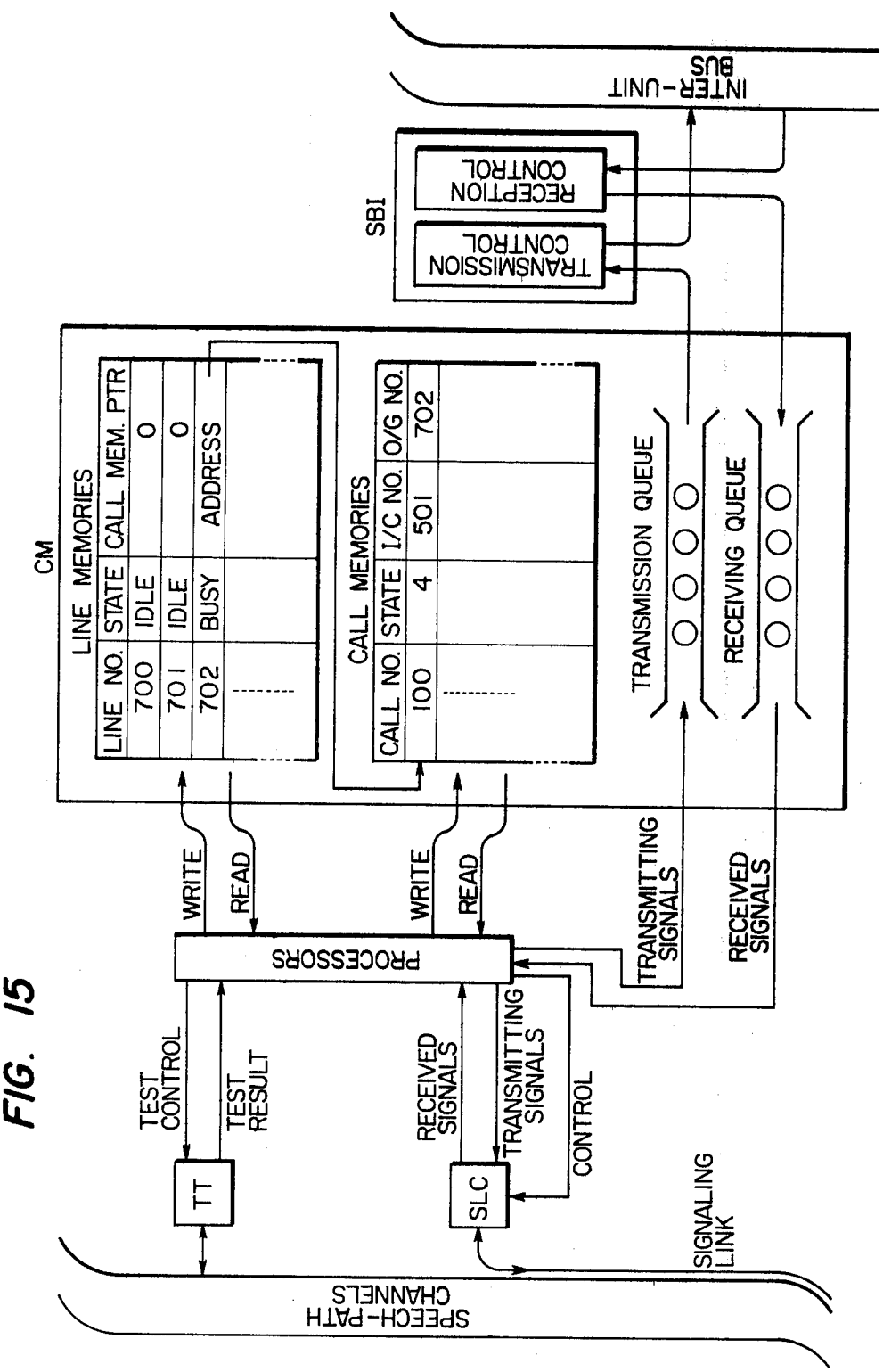
FIG. 15 shows a signal flow in the processing unit of FIG. 14 dealing with a common line signaling system.

FIG. 15 shows the flow of signals in the processing unit consisting of above mentioned hardware handling a common channel signaling system (e.g., CCITT No. 7 signaling system). The signals coming into or going out of the signaling link are received by or transmitted from the SLC. The signals received by SLC are sent to the processors. The signals to be transmitted from SLC are produced in one of the processors and transferred to SLC. Continuity check of each speech-path is done by TT which is controlled by the processor, and the result is fed to the processor. The configuration of CM and SBI are exactly the same as those of FIG. 10.

The flow of signals in the present unit and the processing procedure will be explained below with reference to the signal sequence for a successful call connection of FIG. 7. The unit here may be represented by Po of FIG. 7.

The seizure signal (fitted to the internal unified signaling system) related to a certain speech-path, e.g. the line No. 702, is sent by the switching unit S through the inter-unit bus to the receiving queue in CM under the reception control section of SBI, and it is taken out by the processor. The processor then changes the state in the line memory corresponding to the line No. 702 to the busy state, picks up a call memory for the call using the speech-path (line No. 702), and writes its address in the call memory pointer area of the line memory. The call state of the call memory (where the call number is assumed to be 100 for convenience of explanation) is set to the address signal waiting state, and the I/C circuit number and O/G circuit number, 501 and 702 are written in the corresponding areas of the call memory respectively.

On receiving the address signal (adapted to the present internal unified signaling system) through the inter-unit bus, the processor produces the outgoing-circuit-indication signal including the outgoing line No. 702 to be sent for the incoming processing unit Pi, and writes it into the transmission queue. The signal is sent over the inter-unit-bus under the control of the transmission control section of SBI. The processor also produces the address signal adapted to the signaling system dealt by the present unit and supplies it to SLC. SLC sends this signal onto the signaling link. The processor further initiates TT to execute the continuity check of the outgoing line 702. The result of the check is sent back from TT to the processor. After ascertaining the continuity, the processor causes SLC to send the continuity signal onto the signaling link on one hand and changes the state of the call memory No. 100 to the address complete signal waiting state on the other hand. The address complete signal is received by SLC through the signaling link and transferred to the processor. The processor, receiving the signal, changes the call state in the call memory No. 100 to its answer waiting state, and sends the address complete signal (adapted to the internal unified signaling system) to Pi at the incoming side. Similarly, on reception of the answer signal through the signaling link via SLC, the processor changes the call state of No. 100 to the state in which conversation takes place and transmits the answer signal (adapted to the internal unified signaling system) through the transmission queue to Pi.

When receiving a clear-back signed from the signaling link, the processor changes the call state of No. 100 to clear-forward waiting, and sends the clear-back signal (adapted to the internal unified signaling system) to Pi.

The processor releases No. 100 call memory in response to the clear-forward signal supplied by the switching unit through the inter-unit bus. The processor also changes the state in the line memory of line 702 to the idle state, and transmits the release-guard signal (adapted to the unified signaling system) through the inter-unit bus to the switching unit.

Figure 16:
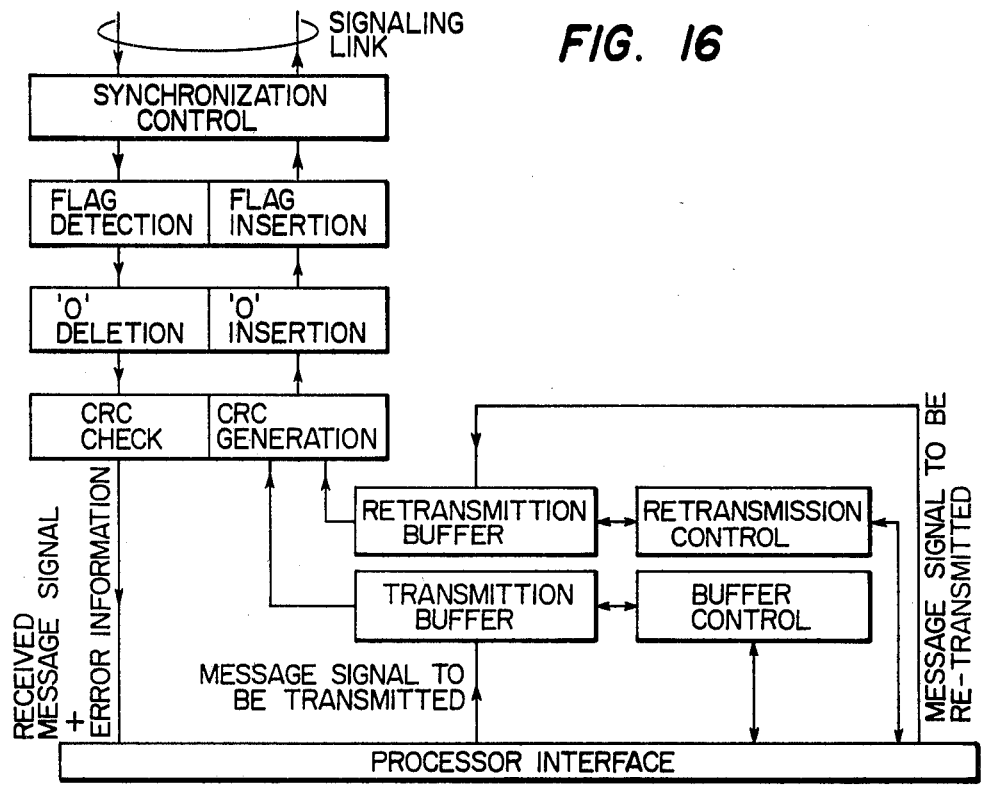
FIG. 16 shows an embodiment of a signal link controller SLC illustrated in FIG. 14.

FIG. 16 shows a configuration of SLC in detail. This configuration is that of the CCITT No. 7 signaling system. As the signaling link carries digital signals, a synchronization control circuit is provided where SLC is connected with the signaling link. The inner side of the sync. control circuit is connected with a flag processing circuit which deals with flags that separate each signal unit inserted between them. This circuit consists of a section for inserting a flag between signal units at the transmission side and a section for detecting the flag and separating each signal to be sent to the processor.

The inner part of the flag processing circuit is connected with a '0' insertion (transmission side) and a '0' delection (receiving side) circuit. In the No. 7 signaling system, a pattern '01111110' is used as the flag. To avoid malfunction caused by a signal unit having the same pattern as the flag, or to secure signal transparency, a '0' is forced to be inserted after continous five '1's at the transmitting side if a transmitting signal includes more than five consecutive '1's. At the receiving side, the '0' after five consecutive '1's is deleted.

Inside the '0' insertion/deletion circuit a CRC (Check Redundancy Code) processing circuit is provided. The CRC is a code which is added to each signal unit to detect errors introduced in the course of the transmission. At the transmitting side, CRC is produced and inserted. This code is checked at the receiving side to detect the occurrence of errors. If an error is present, it is informed to the processor.

The circuits mentioned so far are the same in construction as those for HDLC (High-Level Data Link Control), and therefore in practive the circuits or LSIs developed for HDLC are well available for the present purpose.

In the transmission route, a transmission buffer is provided and the signal units are temporarily stored there before they are sent out with a correct timing. This buffer is controlled by the buffer control circuit. For signal units in which transmission errors were detected at the exchange where the other end of the signaling link is connected, the retransmission buffer is provided. The signal units to be re-transmitted are temporarily stored there and then transmitted in the period during which the transmission of new signal units is not carried out. As a control circuit for the buffer, the retransmission control circuit is provided. SLC, comprising the above mentioned circuits, is connected to the intra-unit bus of the processing unit via processor interface.

The configuration shown here is an example of SLC adapted to No. 7 signaling system, but those for other signaling systems will be realized with similar constructions. Signal link control circuits of similar constructions are actually used for CCIS (Common Channel Inter-Office Signaling).

Figure 17:
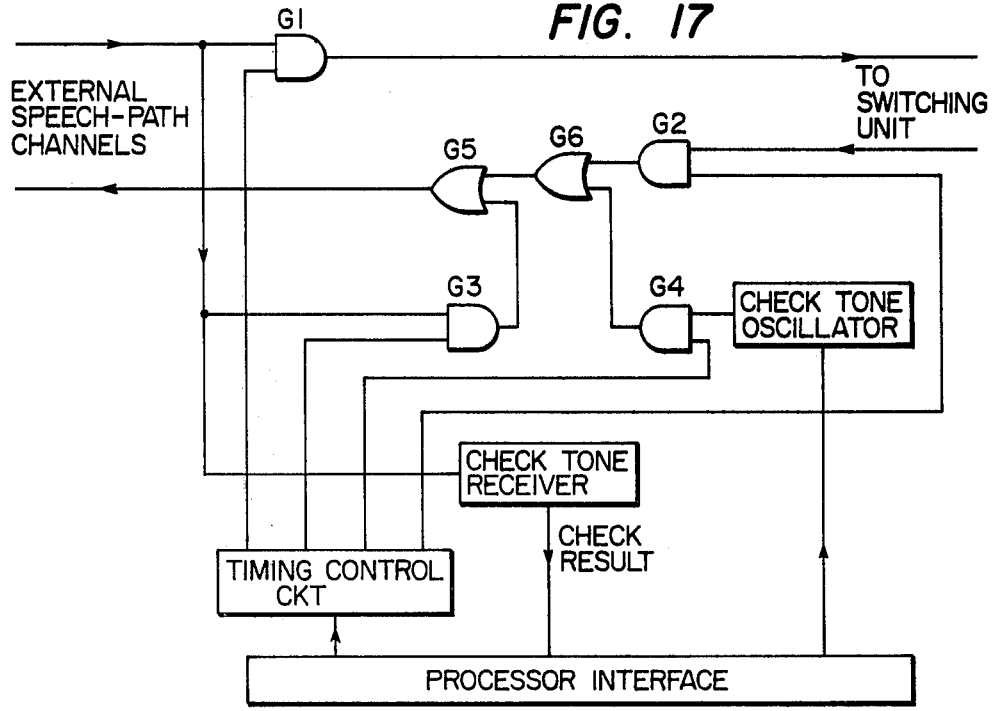
FIG. 17 shows an embodiment of a test trunk TT illustrated in FIG. 14.

FIG. 17 shows a configuration of TT (Test Trunk) in detail. TT is used for the continuity check of individual speech-paths, and comprises a check tone oscillator for continuity check tone generation, a check tone receiver for continuity check tone reception and a timing control circuit for gate control.

In this case, the timing control circuit closes the gates G2 and G3 to give their outputs 'logic 0', and opens the gate G4 by applying the 'logic 1' at one of the inputs of the gate, so that a check tone pattern is sent out through the gate to the speech-path under test. In the telephone switching system at the other end where the present speech-path is acconnected, a short circuit is made between the incoming and the outgoing lines (a speech-path consists of an incoming line and an outgoing line according to the direction of transmission), therefore the test tone is sent back through the incoming line if the speech-path is in good condition. The test tone is received and analyzed at the check tone receiver and the result is informed to the processor. The signal at the incoming line does not leak to the switching unit because the gate G1 is closed at that time.

In case the continuity check is made by the exchange to which the other end of the speech-path under test is connected, the timing control circuit closes the gate G1 so that the test tone on the incoming line does not leak to the switching unit. At the same time, the Gate G3 is opened to make a short circuit between the incoming line and the outgoing line of the speech-path, therefore the signal on the incoming line is directed to the outgoing line, while the gates G2 and G4 are closed so as to give the output logic "0".

The signal link controller SLC control the transfer of messages on the common channel. The speech-path test trunk TT is for assuring the right connection of the speech-path by sending out a tone over the path or for short-circuiting the input and output lines of the speech-path under test in response to an external requirement. The control of these equipments and the call processing is performed by one or more microprocessors. Other functions are the same as those of the processing unit of the MF signaling system shown in FIG. 9.

FIG. 18 shows a concrete example of the switching unit S. 401 and 402 are channels to and from processing units P, and 403 is the links to and from the other T-SWs for alternative routing. The switching unit includes a memory switch T-SW, micro-processors $\mu$P21, $\mu$P22 . . . $\mu$P1, a common memory CM for $\mu$Ps, and a system bus interface SBI between the present switching unit and the inter-unit bus for information transfer to and from other units. As the memory switch T-SW, the ones described in the specification of the U.S. Pat. No. 4,168,401 and in U.S. Pat. No. 4,071,701 are available. The memory switch T-SW is controlled by one or more $\mu$Ps for switching each multiplexed channel. The other parts are the same as those in the processing unit P. The distributive accommodation of the channels of many different routes to each switching unit minimizes the alternative route selection, decreasing overall time requirement for call connection.

Figure 19:
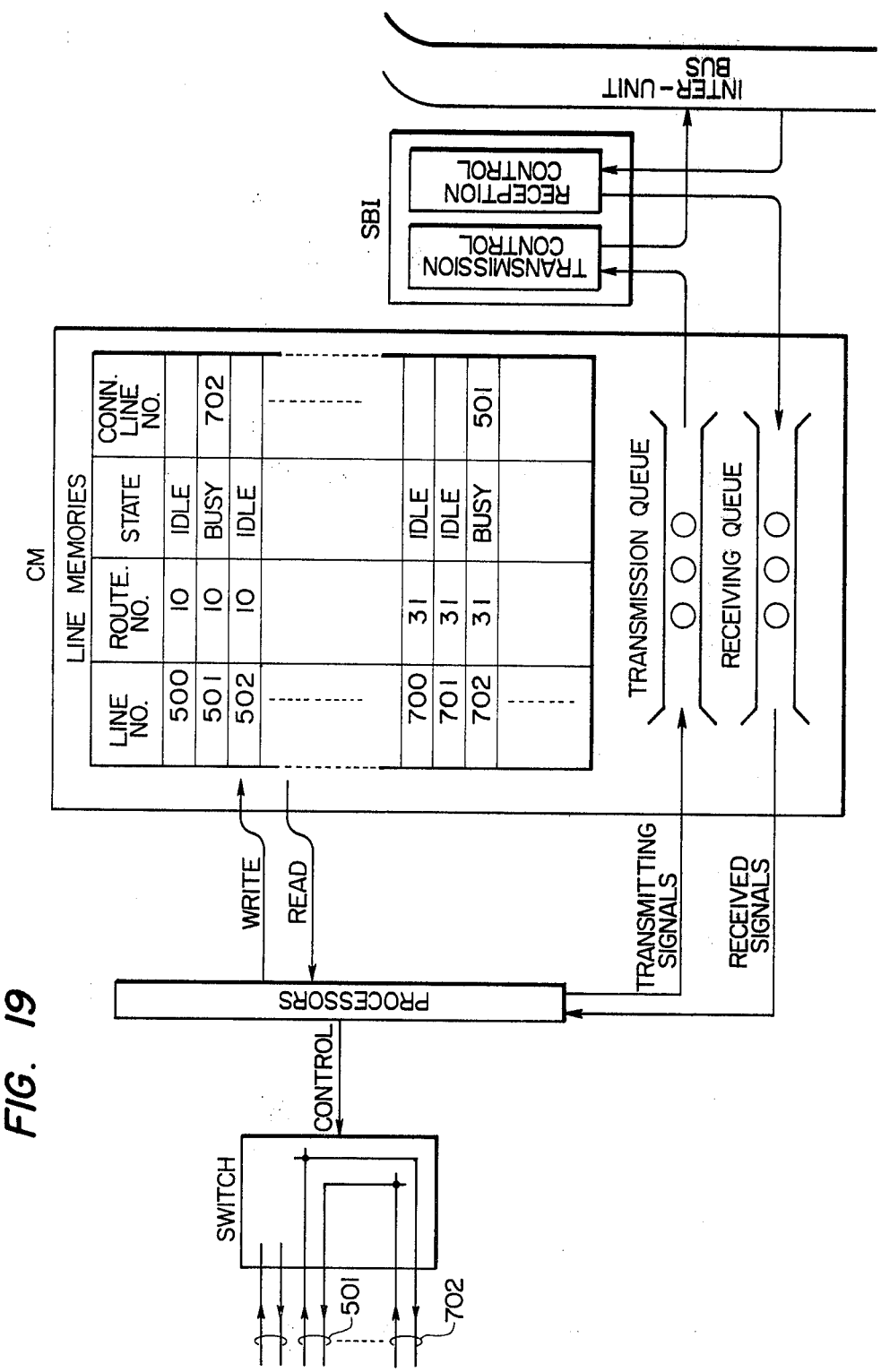
FIG. 19 shows a signal flow in the switching unit.

A signal flow in the switching unit having such hardware construction is shown in FIG. 19. The on-off controls of the switches are carried out by the processors. CM includes queues for transmitting and receiving signals through the inter-unit bus and line memories each of which is associated with a particular speech-path. Each line memory memorizes the route number indicative of the route to which the speech-path is directed, and busy/idle state of the speech-path, and the line number of which said busy line is connected. The SBI is controlled in exactly the same way as those of FIGS. 10 and 15.

A flow of signals and the procedure of processing in the unit of FIG. 19 will be explained below with reference to FIG. 7 where a signal sequence for a successful call is shown. The switching unit shown in FIG. 19 corresponds to S of FIG. 7. A seizure signal, adapted to the internal unified signaling system, transmitted from the processing unit Pi through the inter-unit bus is received by the reception control section of SBI and transferred to the receiving queue of CM. The processor of FIG. 19 takes out this signal and changes the line state in the line memory corresponding to the incoming speech-path, e.g., line 501, to the busy state so as to reserve this line.

The processor, in response to the reception of the signal consisting of address digits and the outgoing route number, selects one of the idle speech-paths of the designated route. In FIG. 19 it is assumed that the route number is 31 and the number of the selected speech-path is 702. The processor writes a connected line number 702 into the line memory of the line 501, changes the line state in the line memory of the line 702 to the busy state, and writes 501 in the connected line number area. The processor controls the switching network to connect the lines 501 and 702, and sends via the inter-unit bus the address signal to the processing unit Po to which the outgoing speech-path 702 is connected.

Receiving the clear forward signal from the processing unit Pi, the processor controls the switching network to cut off the line 702 from the line 501, changing the line state in the line memory of the line 501 to the idle state. The processor then sends a release guard signal to Pi and a clear-forward signal to Po via inter-unit bus. In response to the release guard signal from Po, the processor changes the line state in the line memory of the outgoing line 702 to the idle state. As described above, the switching unit S, in response to the signals (adapted to the internal unified signaling system) from other units, selects, connects and disconnects lines. Therefore it can be said to be a simple function small size telephone switching unit. In other words, the function of the switching unit is exactly the same as a general type switching system except that the signals are transmitted via the inter-unit bus, the handled signals are simplified so as to be adapted to the internal unified signaling system, and the call processing is confined to selection, connection and disconnection of lines. Therefore, both the hardware and software of this unit will easily be realized using the technology of the known switching system. As described above, according to the distributed switching system of the present invention, the entire call processing is shared by a plurality of processing units each dealing with its assigned lines. For that purpose, the common data for the call processing are distributed to every unit. Furthermore, the switching unit not only controls the switches but also effects the call processing associated with switching for each call by means of a small size simple function switching unit. Therefore, the switching system of this invention is more distributive than the one described in the specification of U.S. Pat. No. 4,194,090, cited here as a conventional technology.

As is mentioned above, the distributed switching system of this invention consists of units which are independent of each other, therefore it can be a failsafe system in which the influences of hardware troubles or the software bugs are localized. When a part of a switching system is damaged or the system is troubled in an emergency such as a fire, the service can be continued by the remaining part since the main units can be distributed within a building or to other buildings.

Because each processing unit is located at the terminal position viewed from the intra-office network, being independent of the entire system, it is easy to add and/or modify signaling systems or services without any influence upon the entire system. Owing to the increased freedom of unit combination, a switching system of the optimum scale and function will be realized, that fits to the contemporary requirement.

Furthermore, the production cost will be minimized by utilization of general-purpose micro-processors and high speed memories.

What we claim is:

1. A distributed switching system operating as a single large switching system as a whole comprising:
   a plurality of switching units including speech-path switches and processors which control the said speech-path switches, and speech-path links interconnecting said switching units for alternative routing between the units;

a plurality of processing units connected to speech paths for signal and call processing, each of said processing units including a trunk circuit connected with a group of said speech-paths for processing signals in accordance with signaling systems of the said speech-path group and also including a processor for controlling said trunk circuit, said processing units being operative to process signals and calls coming in from and going out to the said speech-paths; and an inter-unit bus for transferring information between said switching units and said processing units, each said switching unit being operative as a small size simple function switching system which is highly independent of the other switching units, and each said processing unit being operative to process independently of the other processing units only incoming calls which come in to the processing unit to which the speech-paths carrying said incoming calls is connected or to process only outgoing calls which go out of the processing unit to which the speech-paths carrying said outgoing calls is connected.

2. A distributed switching system according to claim 1, wherein each processing unit deals with a speech-path group of only one sort of signaling system, and its functions are confined to the signal and call processing of that signaling system.

3. A distributed switching system according to claim 1 wherein said switching units are provided with a unified signaling system independent of the signaling systems of said speech-paths, each said processing unit being operative to convert signals provided by the signaling system of an incoming speech path to signals of said unified signaling system and being operative to convert signals of said unified signaling system to signals consistent with those used in the signaling system of an outgoing speech path, whereby said switching units are controlled only by signals of said unified signaling system.

4. A distributed switching system according to claim 2 wherein said switching units are provided with a unified signaling system independent of the signaling systems of said speech-paths, each said processing unit being operative to convert signals provided by the signaling system of an incoming speech path to signals of said unified signaling system and being operative to convert signals of said unified signaling system to signals consistent with those used in the signaling system of an outgoing speech path, whereby said switching units are controlled only by signals of said unified signaling system.

* * * * *